(12) United States Patent
Shirakawa et al.

(10) Patent No.: US 8,053,538 B2
(45) Date of Patent: Nov. 8, 2011

(54) ETHER COMPOSITION AND SOLUTION COMPOSITION

(75) Inventors: Daisuke Shirakawa, Tokyo (JP); Kazuya Oharu, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 805 days.

(21) Appl. No.: 12/019,877

(22) Filed: Jan. 25, 2008

(65) Prior Publication Data

US 2008/0132664 A1 Jun. 5, 2008

Related U.S. Application Data

(63) Continuation of application No. PCT/JP2006/314598, filed on Jul. 24, 2006.

(30) Foreign Application Priority Data

Jul. 27, 2005 (JP) .................................. 2005-217111

(51) Int. Cl.
*C08F 16/24* (2006.01)

(52) U.S. Cl. ........ 526/247; 134/40; 360/970.2; 510/245

(58) Field of Classification Search .................. 526/247; 134/40; 360/970.2; 510/245
See application file for complete search history.

(56) References Cited

U.S. PATENT DOCUMENTS

| | | | | |
|---|---|---|---|---|
| 6,348,266 | B1 * | 2/2002 | Liu et al. | 428/421 |
| 6,478,880 | B1 * | 11/2002 | Shank | 134/40 |
| 6,660,886 | B1 * | 12/2003 | Liu et al. | 564/159 |
| 6,700,735 | B2 * | 3/2004 | Gregory et al. | 360/97.02 |
| 7,579,304 | B2 * | 8/2009 | Liu et al. | 508/422 |
| 7,795,375 | B2 * | 9/2010 | Shirakawa et al. | 528/405 |
| 2006/0252910 | A1 * | 11/2006 | Shirakawa et al. | 528/401 |

FOREIGN PATENT DOCUMENTS

| | | |
|---|---|---|
| EP | 1 553 123 A1 | 7/2005 |
| JP | 6-504804 | 6/1994 |
| JP | 7-18083 | 1/1995 |
| JP | 2000-169481 | 6/2000 |
| JP | 2006-45159 | 2/2006 |
| WO | WO 02/088218 A1 | 11/2002 |
| WO | WO 2004/035656 A1 | 4/2004 |
| WO | WO 2005/068534 A1 | 7/2005 |
| WO | WO 2006/011387 A1 | 2/2006 |
| WO | WO-2007/013412 A1 * | 2/2007 |
| WO | WO-2009/093665 A1 * | 7/2009 |
| WO | WO-2009/093886 A1 * | 7/2009 |

OTHER PUBLICATIONS

U.S. Appl. No. 12/793,212, filed Jun. 3, 2010, Shirakawa.
U.S. Appl. No. 12/793,757, filed Jun. 4, 2010, Shirakawa, et al.
C. Corti, et al., "Perfluoropolyether Lubricants", Journal of Synthetic Lubrication, vol. 9, No. 4, XP-002572354, 1993, pp. 311-330.
W.R. Jones, Jr., et al., "The Preparation of New Perfluoroether Fluids Exhibiting Excellent Thermal-Oxidative Stabilities", NASA Technical Memorandum 87284, XP009130672, 1986, 19 pages.
U.S. Appl. No. 13/038,472, filed Mar. 2, 2011, Shirakawa, et al.

* cited by examiner

*Primary Examiner* — Peter D. Mulcahy
*Assistant Examiner* — Henry Hu
(74) *Attorney, Agent, or Firm* — Oblon, Spivak, McClelland, Maier & Neustadt, L.L.P.

(57) ABSTRACT

To provide an ether composition containing no —$OCF_2O$— structure, having a low viscosity and being excellent in chemical stability in a wide temperature range. An ether composition comprising a polyether compound (A) containing at least two —$(OCF_2CF_2)$— units, containing no —$OCF_2O$— structure and having an average molecular weight of higher than 2,000 and at most 20,000, and an ether compound (B) containing at least one —$(OCF_2CF_2)$— unit and having an average molecular weight of at most 2,000.

12 Claims, No Drawings

ETHER COMPOSITION AND SOLUTION COMPOSITION

TECHNICAL FIELD

The present invention relates to an ether composition useful as a lubricant, etc.

BACKGROUND ART

Perfluorinated polyether compounds having a plurality of functional groups at their terminals are widely used as a lubricant, a surface modifier, a surfactant, etc. The present inventors have provided an effective process for producing a compound containing no —$OCF_2O$— structure among perfluorinated polyether compounds (Patent Document 1). Further, they have found that such a compound is excellent in self-replenishing property and is chemically stable. The self-replenishing property is such a nature that when a part of a coating film formed by application of a compound to a substrate surface becomes defective by a certain reason, the compound around the defective portion will cover the defective portion to replenish the defective portion.

However, they have noticed that when the compound containing no —$OCF_2O$— structure is applied to a substrate, the viscosity tends to be high as compared with a perfluoropolyether having a molecular weight at the same level and containing a —$OCF_2O$— structure. They have noticed that particularly the viscosity of a polyether containing no —$OCF_2O$— structure and having three or more hydroxyl groups at its terminal is higher by several times. Further, when a polyether compound containing no —$OCF_2O$— structure is used at low temperature, the self-replenishing property tends to decrease.

Patent Document 1: WO04/035656

DISCLOSURE OF THE INVENTION

Object to be Accomplished by the Invention

The object of the present invention is to solve the above problem and to provide an ether composition having a low viscosity and being excellent in chemical stability in a wide temperature range.

Means to Accomplish the Object

The present invention provides the following.

(1) An ether composition comprising a polyether compound (A) containing at least two —($OCF_2CF_2$)— units, containing no —$OCF_2O$— structure and having an average molecular weight of higher than 2,000 and at most 20,000, and an ether compound (B) containing at least one —($OCF_2CF_2$)— unit and having an average molecular weight of at most 2,000.

(2) The ether composition according to (1), wherein the polyether compound (A) comprises one or more of compounds represented by the following formula (A-1) having an average molecular weight of higher than 2,000 and at most 20,000 and/or one or more of compounds represented by the following formula (A-2) having an average molecular weight of higher than 2,000 and at most 20,000:

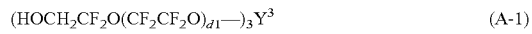   (A-1)

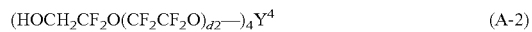   (A-2)

wherein $Y^3$ is a perfluoroalkane triyl group, $Y^4$ is a perfluoroalkane tetrayl group, d1 is a positive number of at least 1, and d2 is a positive number of at least 1.

(3) The ether composition according to (1) or (2), wherein the polyether compound (A) has an average molecular weight of higher than 2,000 and at most 10,000 and a molecular weight distribution ($M_w/M_n$) of from 1.05 to 1.65.

(4) The ether composition according to (1), (2) or (3), wherein the absolute viscosity of the polyether compound (A) at 20° C. is at least 1,500 mPa·s, and the absolute viscosity of the ether composition at 20° C. is lower by at least 200 mPa·s than the absolute viscosity of the polyether compound (A) at 20° C.

(5) The ether composition according to any one of (1) to (4), wherein the ether compound (B) is any one or more selected from compounds represented by the following formulae (B-1) to (B-6):

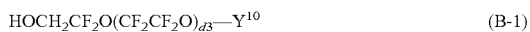   (B-1)

   (B-2)

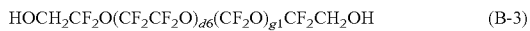   (B-3)

   (B-4)

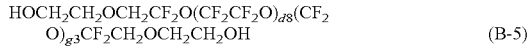   (B-5)

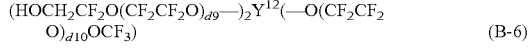   (B-6)

wherein in the formula (B-1), $Y^{10}$ is a $C_{1-6}$ perfluoroalkyl group, d3 is a positive number of at least 1, and the average molecular weight of the compound represented by the formula (B-1) is from 1,000 to 2,000;

in the formula (B-2), $Y^{11}$ is a perfluoroalkane triyl group, d4 is a positive number of at least 1, and the average molecular weight of the compound represented by the formula (B-2) is from 500 to 2,000;

in the formula (B-3), d6 is a positive number of at least 1, g1 is a positive number of at least 0, and the average molecular weight of the compound represented by the formula (B-3) is from 500 to 2,000;

in the formula (B-4), d7 is a positive number of at least 1, g2 is a positive number of at least 0, and the average molecular weight of the compound represented by the formula (B-4) is from 500 to 2,000;

in the formula (B-5), d8 is a positive number of at least 1, g3 is a positive number of at least 0, and the average molecular weight of the compound represented by the formula (B-5) is from 500 to 2,000; and in the formula (B-6), each of d9 and d10 is a positive number of at least 1, $Y^{12}$ is a perfluoroalkane triyl group, and the average molecular weight of the compound represented by the formula (B-6) is from 500 to 2,000.

(6) The ether composition according to any one of (1) to (5), wherein the absolute viscosity of the ether compound (B) at 20° C. is less than 1,000 mPa·s.

(7) The ether composition according to any one of (1) to (6), wherein the amount of the ether compound (B) is from 1 to 49 mass % based on the polyether compound (A).

(8) The ether composition according to any one of (1) to (7), which has an absolute viscosity at 20° C. of at most 2,000 mPa·s.

(9) The ether composition according to any one of (1) to (8), which has an average molecular weight of from 1,000 to 20,000, and a molecular weight distribution ($M_w/M_n$) of from 1.02 to 1.7.

(10) A process for producing the ether composition as defined in any one of (1) to (9), which comprises mixing a polyether compound (A) containing at least two —(OCF$_2$CF$_2$)— units, containing no —OCF$_2$O— structure and having an average molecular weight of higher than 2,000 and at most 20,000, with an ether compound (B) containing at least one —(OCF$_2$CF$_2$)— unit and having an average molecular weight of at most 2,000.

(11) A lubricant containing the ether composition as defined in any one of (1) to (9) as an essential component.

(12) A solution composition containing the ether composition as defined in any one of (1) to (9) and a solvent.

(13) The solution composition according to (12), wherein the total concentration of the polyether compound (A) and the ether compound (B) contained in the ether composition in the solution composition is from 0.005 to 50 mass %.

EFFECTS OF THE INVENTION

According to the present invention, an ether composition having a low viscosity and being excellent in chemical stability in a wide temperature range is provided. The ether composition of the present invention has a low vapor pressure and a low viscosity, and its deterioration at the time of use is small. Further, the ether composition of the present invention is a compound excellent in self-replenishing property in a wide temperature range. The ether composition of the present invention is useful as a lubricant, etc.

BEST MODE FOR CARRYING OUT THE INVENTION

The polyether compound (A) in the present invention is a compound containing at least two —(OCF$_2$CF$_2$)— units, containing no —OCF$_2$O— structure and having an average molecular weight of higher than 2,000 and at most 20,000. The average molecular weight in this specification is a value measured by gel permeation chromatography. The average molecular weight of the compound (A) is preferably higher than 2,000 and at most 10,000, particularly preferably higher than 2,000 and at most 8,000. Further, the molecular weight distribution (M$_w$/M$_n$) of the polyether compound (A) is preferably from 1.05 to 1.65. The absolute viscosity of the polyether compound (A) at 20° C. is preferably at least 1,500 mPa·s (millipascal second), particularly preferably from 1,500 to 1.5×10$^4$ mPa·s, especially preferably from 1,800 to 3,000 mPa·s.

The average molecular weight in the present invention represents the number average molecular weight (Mn) unless otherwise specified. Further, a compound having no —OCF$_2$O — structure means a compound in which presence of the structure cannot be detected by a conventional analytical means (such as $^{19}$F-NMR).

One or more types of such polyether compounds (A) may be used. In a case where two or more types of the polyether compounds (A) are used, preferred are two or more types differing in the number of —(OCF$_2$CF$_2$)— units.

The polyether compound (A) is preferably a polyether polyol comprising such a polyether compound having two or more hydroxyl groups at its terminal. Particularly preferred is a polyether triol having three hydroxyl groups at its terminal or a polyether tetraol having four hydroxyl groups at its terminal. Such a compound has advantages such that when the ether composition is used as a lubricant or the like, the boiling point is proper, and when it is used as a lubricant, it is excellent in self-replenishing property as compared with a compound having a small number of hydroxyl groups.

The polyether triol is preferably a compound represented by the following formula (A-1) and having an average molecular weight of higher than 2,000 and at most 20,000:

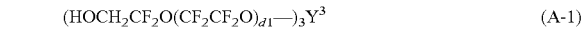

In the formula (A-1), Y$^3$ is a perfluroalkane triyl group, and preferably a C$_{3-6}$ perfluoroalkane triyl group. Y$^3$ is preferably a trivalent group having such a structure that a residue having three hydroxyl groups removed from a triol having three hydroxyl groups is perfluorinated. Y$^3$ is preferably a group (a group represented by the following formula (Y3-1)) having a residue having three hydroxyl groups removed from glycerol perfluorinated. As specific examples of Y$^3$, the following four groups may be mentioned:

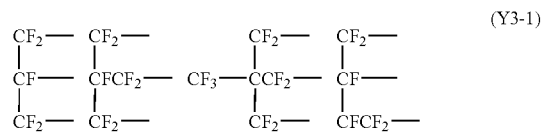

In the formula (A-1), d1 is a positive number of at least 1, and is a number which brings the average molecular weight of the formula (A-1) to be higher than 2×10$^3$ and at most 2×10$^4$. The compound represented by the formula (A-1) is a compound in which three groups represented by HOCH$_2$CF$_2$O(CF$_2$CF$_2$O)$_{d1}$— are present in its molecule, and the numbers of d1 in the three groups may be the same or different. The number of d1 in the formula (A-1) may be represented by the average of the —(OCF$_2$CF$_2$)— units in some cases, and in a usual case, the average of d1 is preferably a positive number of from 1 to 50, particularly preferably a positive number of from 1 to 10.

The polyether tetraol is preferably a compound represented by the following formula (A-2) and having an average molecular weight of higher than 2,000 and at most 20,000:

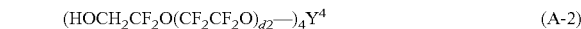

In the formula (A-2), Y$^4$ is a perfluoroalkane tetrayl group, preferably a C$_{4-10}$ perfluoroalkane tetrayl group. Y$^4$ is preferably a tetravalent group having such a structure that a residue having four hydroxyl groups removed from a tetraol having four hydroxyl groups is perfluorinated. Y$^4$ is preferably a group (a group represented by the following formula (Y4-1)) having a residue having four hydroxyl groups removed from pentaerythritol perfluorinated. As specific examples of Y$^4$, the following four groups may be mentioned:

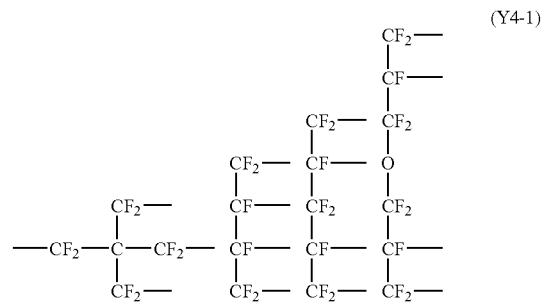

In the formula (A-2), d2 is a positive number of at least 1 and is a number which brings the average molecular weight of the formula (A-2) to be higher than 2×10$^3$ and at most 2×10$^4$. The compound represented by the formula (A-2) is a compound in which four groups represented by HOCH$_2$CF$_2$O(CF$_2$CF$_2$O)$_{d2}$— are present in its molecule, and the numbers of d2 in the four groups may be the same or different. The number of d2 in the formula (A-2) may be represented by the average of the —(OCF$_2$CF$_2$)— units contained in the compound (A-1) in some cases, and is usually preferably a positive number of from 1 to 50, particularly preferably a positive number of from 1 to 10.

In the polyether compound (A) in the present invention, no —OCF$_2$O— structure is present. The present inventors have found that chemical stability of a fluorinated polyether having no —OCF$_2$O— structure is remarkably improved. However, they have noticed that the —OCF$_2$O— structure has a function to lower the viscosity of the compound, and that the polyether compound (A) of the present invention containing no —OCF$_2$O— structure has a high viscosity as compared with a perfluoropolyether having the same structure and molecular weight and containing a —OCF$_2$O— structure.

Accordingly, as a method to lower the viscosity of the polyether compound (A) as the main component, they have studied a method of decreasing the molecular weight of the polyether compound (A), a method of reducing the number of functional groups in its molecule, and the like. However, a method of decreasing the molecular weight of the polyether compound (A) and using it by itself has such drawbacks that no desired function may be obtained, and the compound may volatilize during the use. Further, the volatilized low molecular weight compound may cause contamination. Further, the method of reducing the number of functional groups of the polyether compound (A) has such a drawback that adsorption properties of the compound in a substrate may decrease. Further, the self-replenishing property may decrease. Accordingly, they have considered that these methods are not effective.

Therefore, the present inventors have found to solve the problems arisen when the polyether compound (A) is used by itself, by combining the polyether compound (A) with a specific ether compound (B). The ether compound (B) is a compound containing at least one —(OCF$_2$CF$_2$)— unit and having an average molecular weight (M$_n$) of at most 2,000. The average molecular weight is preferably from 500 to 2,000, particularly preferably from 1,000 to 2,000. The molecular weight distribution (Mw/M$_n$) is preferably from 1.02 to 1.7. The absolute viscosity of the ether compound (B) at 20° C. is preferably at most 1,000 mPa·s, particularly preferably at most 500 mPa·s, especially preferably from 50 to 500 mPa·s. When the viscosity is within the above range, a high lubricant property will be maintained when the composition is used at high temperature.

The ether compound (B) of the present invention may or may not contain a —OCF$_2$O— structure. In view of chemical stability, preferred is a compound containing no —OCF$_2$O— structure. The number of the —(OCF$_2$CF$_2$)— unit in the ether compound (B) is at least 1, preferably at least 2.

The ether compound (B) is preferably one or more compounds selected from a fluorinated ether having no hydroxyl group at its terminal, a fluorinated ether monool having one hydroxyl group at its terminal, and a fluorinated ether polyol having two or more hydroxyl groups at its terminal. The number of hydroxyl groups in the ether compound (B) is preferably from 0 to 4, and from the viewpoint of self-replenishing property and adsorption property, it is preferably from 2 to 3 (i.e. a fluorinated ether diol or a fluorinated ether triol). As specific examples of the ether compound (B), the following compounds may be mentioned:

  (B-1)

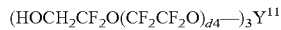  (B-2)

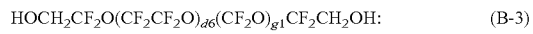  (B-3)

  (B-4)

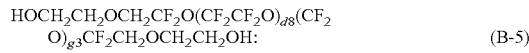  (B-5)

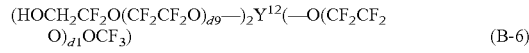  (B-6)

In the formula (B-1), Y$^{10}$ is C$_{1-6}$ perfluoroalkyl group, d3 is a positive number of at least 1, and the average molecular weight of the compound represented by the formula (B-1) is from 1,000 to 2,000.

In the formula (B-2), Y$^{11}$ is a perfluoroalkane triyl group, d4 is a positive number of at least 1, and the average molecular weight of the compound represented by the formula (B-2) is from 500 to 2,000, preferably from 500 to 1,000.

In the formula (B-3), d6 is a positive number of at least 1, g1 is a positive number of at least 0, and the average molecular weight of the compound represented by the formula (B-3) is from 500 to 2,000.

In the formula (B-4), d7 is a positive number of at least 1, g2 is a positive number of at least 0, and the average molecular weight of the compound represented by the formula (B-4) is from 500 to 2,000.

In the formula (B-5), d8 is a positive number of at least 1, g3 is a positive number of at least 0, and the average molecular weight of the compound represented by the formula (B-5) is from 500 to 2,000.

In the formula (B-6), each of d9 and d10 is a positive number of at least 1, Y$^{12}$ is a perfluroalkane triyl group, and the average molecular weight of the compound represented by the formula (B-6) is from 500 to 2,000.

In the above formulae, each of g1, g2 and g3 is preferably 0 (i.e. no (CF$_2$O) unit is present).

The ether compound (B) may be a commercially available perfluoropolyether represented by Fomblin Z series (tradename, manufactured by Solvay).

The composition of the present invention comprises the polyether compound (A) and the ether compound (B). The amount of the ether compound (B) based on the polyether compound (A) is preferably from 49 to 1 mass %, and from the viewpoint of performance of the lubricating oil, especially preferably from 25 to 5 mass %. The average molecular weight of the composition is preferably from 1,000 to 20,000, particularly preferably from 1,000 to 3,000, especially preferably from 1,000 to 2,000. The molecular weight distribution (Mw/Mn) is preferably from 1.02 to 1.7, particularly preferably from 1.05 to 1.65. A composition with a too broad molecular weight distribution (Mw/Mn) may have drawbacks resulting from low molecular weight and high molecular weight components. Accordingly, it is preferred to prevent inclusion of a compound having a molecular weight out of the average molecular weight distribution range as far as possible.

The polyether compound (A) of the present invention may be obtained also by esterifying terminal hydroxyl groups of a polyhydric polyethylene glycol formed by adding ethylene oxide to a polyhydric alcohol having a carbon skeleton corresponding to the polyether compound (A) in the same manner as a method disclosed in e.g. WO04/035656, followed by liquid phase fluorination and ester decomposition reaction.

The ether compound (B) may also be obtained by the same method as preparation of the polyether compound (A) and in addition, a commercially available product may be used. The commercially available product may, for example, be Fomblin Z series (manufactured by Solvay) or Demnum (manufactured by DAIKIN INDUSTRIES, LTD.). Further, it may be obtained also by esterifying terminal hydroxyl groups of a polyhydric polyethylene glycol formed by adding ethylene oxide to an alcohol such as methanol or ethanol in the same manner as a method disclosed in e.g. WO02/004397, followed by liquid phase fluorination and ester decomposition reaction.

In a case where the polyether compound (A) of the present invention is obtained by the above method of liquid phase fluorination, the product is preferably purified by column chromatography. For the stationary phase and the mobile phase of column chromatography, general purpose ones may be used. The polyether compound (A) is a fluorinated compound, and a fluorine type solvent is generally used for the mobile phase, but a non-fluorine solvent may also be used.

In a case where the polyether compound (A) is purified by column chromatography, the ether composition of the present invention may directly be obtained as a purified product. Further, a product contained in a fraction other than the aimed fraction in the purification of the polyether compound (A) may be used as the ether compound (B).

The absolute viscosity of the ether composition of the present invention is preferably lower by at least 200 mPa·s than the absolute viscosity of the polyether compound (A) at 20° C. The absolute viscosity of the ether composition at 20° C. is preferably at most 2,000 mPa·s, particularly preferably from 1,300 to 2,000 mPa·s.

Further, the average molecular weight of the ether composition is preferably from 1,000 to 20,000, particularly preferably from 1,000 to 10,000. The molecular weight distribution ($M_w/M_n$) of the ether composition is preferably from 1.02 to 1.7. The ether composition of the present invention is used preferably within a temperature range of from −40° C. to 80° C. When the composition of the present invention is used at about 80° C., the absolute viscosity of the composition may be kept at from about 10 to about 500 (mPa·s).

A process for producing the ether composition of the present invention is not particularly limited, and a process of mixing the polyether compound (A) with the ether compound (B) may be mentioned.

The ether composition of the present invention is useful as a lubricant, a surface modifier or a surfactant. Particularly for an application in which the surface of a substrate is covered, the composition is an advantageous composition in that it has a low viscosity and is chemically stable, and that it can prevent problems such as bleed out.

As a lubricant, an application may be mentioned in which the composition is applied to a diamond-like carbon protective film (DLC film) for magnetic disks. As a surface modifier, an application may be mentioned in which the composition is applied to the surface of a polymer to control the refractive index of the polymer, or to improve chemical resistance of the polymer.

In a case where the ether composition is used as a lubricant or a surface modifier, it is preferably used as a solution composition. In the case of use as a solution composition, the solvent may be a commercially available solvent. A fluorine type solvent is especially preferred, and a perfluoroalkylamine such as perfluorotripropylamine or perfluorotributylamine, or a perfluoroalkane such as Vertrel (manufactured by Du Pont Kabushiki Kaisha) may, for example, be mentioned. Among them, a CFC solvent represented by R-113 is subjected to control as a chlorofluorohyrocarbon with a high probability of ozone depletion. Further, a PFC and a HFC are also subjected to control and accordingly their use tends to be restricted. Accordingly, as a solvent, preferred is a fluorinated ether which will be used in future, which is highly soluble and which applies a light environmental burden. Particularly in view of the boiling point and the solubility, preferred is use of $CF_3CH_2OCF_2CF_2H$ (manufactured by Asahi Glass Company, Limited, tradename: AE-3000). This solvent has a boiling point suitable for coating (e.g. coating in dip coating step).

The concentration of the ether composition in the solution composition may be suitable adjusted depending upon the purpose of use, and it is preferably from 0.005 to 50 mass %, more preferably from 0.01 to 20 mass %.

The solution composition of the present invention may contain a component (hereinafter referred to as another component) other than the polyether compound (A) and the solvent. In a case where the polyether compound (A) is used as a lubricant, another component may, for example, be a radical scavenger (such as X-1p, trade name, manufactured by Dow Chemicals). In a case where the polyether compound (A) is used as a coating material, another component may be a silane, epoxy, titanium, aluminum or another coupling agent.

In a case where the polyether compound (A) is used as a lubricant or a surface modifier, it is preferred to develop an aimed function by applying the polyether compound (A) or the solution composition containing the polyether compound (A) to the substrate surface, followed by drying to form a thin membrane of the polyether compound (A).

The coating method may, for example, be roll coating, casting, dip coating, spin coating, water casting, die coating, a Langmuir-Blodgett method, or a vacuum deposition method, and preferably spin coating, dip coating or a vacuum deposition method.

A thin membrane formed by using the ether composition of the present invention is transparent, has a low refractive index, or is excellent in heat resistance or chemical resistance. Further, the thin membrane has high lubricity and has self-replenishing property. The thickness of the thin membrane is usually preferably from 0.001 to 50 μm. The shape and the material of the substrate are not particularly limited. The substrate coated with the solution composition containing the polyether compound (A) of the present invention may be used for e.g. a hard disk substrate, optical fibers, a mirror, a solar battery, an optical disk, a touch panel, a photoconductor or fuser drum, a film condenser, or a film such as an antireflection film for glass window.

Another application of the ether composition may, for example, be an additive to be added to a wire coating material, an ink repellent (e.g. for coating or for a printer such as an ink jet printer), an adhesive for semiconductor device (such as an adhesive for LOC (lead on chip)) tape, a protective coating for semiconductor (such as a moistureproof coating agent or an ascent inhibitor for soldering) or a thin membrane (such as a pellicle membrane) to be used in optical field, a lubricant for an antireflection film for displays and an antireflection film for resists.

When the ether composition of the present invention is used for these applications, an advantage can be obtained such that performance can be maintained stably over a long period of time.

EXAMPLES

Now, the present invention will be described in further detail with reference to Examples. However, it should be understood that the present invention is by no means thereby restricted.

In the following, tetramethylsilane is represented by TMS, $CCl_2FCClF_2$ by R-113, and dichloropentafluoropropane by R-225.

$M_w$ represents the mass average molecular weight, and $M_n$ represents the number average molecular weight. The average molecular weight means $M_n$, and the molecular weight distribution means $M_w/M_n$.

The molecular weight was measured by gel permeation chromatography (hereinafter referred to as GPC). The measurement by GPC was carried out in accordance with the method disclosed in JP-A-2001-208736. Specifically, using as a mobile phase a solvent mixture (99:1 volume ratio) of R-225 (Asahiklin AK-225SEC Grade 1, tradename, manufactured by Asahi Glass Company, Limited) and hexafluoroisopropyl alcohol, two PLgel MIXED-E columns (tradename, manufactured by Polymer Laboratories Ltd.) were connected in series to constitute a column for analysis. The analysis was carried out by using, as standard samples for measuring the molecular weight, four types of perfluoropolyethers having molecular weights of from 2,000 to 10,000 and $M_w/M_n$ less than 1.1 and one type of a perfluoropolyether having a molecular weight of 1,300 and $M_w/M_n$ of at least 1.1. The mobile phase flow rate was set to be 1.0 mL/min, the column temperature was set at 37° C., and as the detector, an evaporation light scattering detector was employed.

TMS was used as a standard substance for $^1$H-NMR (300.4 MHz), and CFCl$_3$ was used as a standard substance for $^{19}$F-NMR (282.7 MHz). R-113 was used as a solvent for NMR, unless otherwise specified.

The measurement of the absolute viscosity was carried out by a cone-plate viscometer (manufactured by Wells-Brookfield). The measuring method is to fill a measurement unit having a cone-plate shape with a sample, and measuring the torque when driven at a discontinuous variable speed of revolution to measure the absolute viscosity.

Example 1

Example for Synthesis of Compound (A-11)

Ethylene oxide was added to glycerol by a known method, and FCOCF(CF$_3$)OCF$_2$CF(CF$_3$)O(CF$_2$)$_3$F was reacted with the terminal hydroxyl groups to obtain an esterified-body. The obtained esterified-body was dissolved in R-113 (312 g) and fluorinated by a fluorine gas diluted to 20% with a nitrogen gas (hereinafter referred to as a 20% fluorine gas). The solvent was distilled off from the product under reduced pressure to obtain a fluorinated body which was liquid at room temperature. To the fluorinated body, 1,1,3,3-tetrachlorohexafluorobutane and KF were added, followed by vigorous stirring, and the fluorinated body was decomposed at 120° C. to obtain a decomposed product which was liquid at room temperature. To the decomposed product, KF and R-113 were charged, methanol was added, and the reaction was carried out for 8 hours while keeping the temperature so as not to be 25° C. or below, and then, KF, R-113 and methanol were removed to obtain a methyl ester body. To the methyl ester body, R-225 and tetrahydrofuran (200 mL) were mixed, and a borane-tetrahydrofuran complex was added in a stream of nitrogen, and the mixture was reacted at room temperature overnight. The solvent was distilled off by an evaporator, 2 mol/L hydrochloric acid was added to the residue, followed by extraction with R-225, and the extract was concentrated to obtain a crude product (11.95 g). The crude product was purified by silica gel column (eluent: R-225/hexafluoroisopropyl alcohol). As a result of analysis by $^1$H-NMR and $^{19}$FNMR, formation of the following compound (A-11) was confirmed (in the formula, the total number of k, r and p is a positive number which brings $M_n$ of (A-11) to be 2,100). It was confirmed that no —OCF$_2$O— structure was contained in the compound (A-11). Of the compound (A-11), $M_n$ was 2,100 and $M_w/M_n$ was 1.28. The absolute viscosity at 20° C. was 2,250 mPa·s:

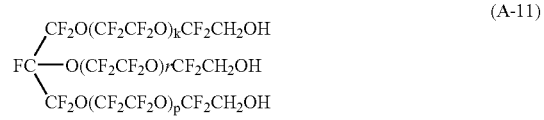

(A-11)

$^1$H-NMR δ (ppm): 3.94
$^{19}$F-NMR δ (ppm): −80.1, −88.2 to −90.5, −135.0 to −139.0, −181.5 to −184.5

Example 2

Example for Synthesis of Compound (A-21)

The following compound (A-21) (in the formula, k is a positive number which brings $M_n$ of (A-21) to be 4,212) in the same manner as in Example 1 except that pentaerythritol was used instead of glycerol. It was confirmed that no —OCF$_2$O— structure was contained in the compound (A-21). Of the compound (A-21), $M_n$ was 4,212, $M_w/M_n$ was 1.21, and the absolute viscosity at 20° C. was 1,900 mPa·s:

$$C(CF_2O(CF_2CF_2O)_kCF_2CH_2OH)_4 \quad (A\text{-}21)$$

$^1$H-NMR δ (ppm): 3.94
$^{19}$F-NMR δ (ppm): −64.2 to −65.8, −80.1, −88.2 to −90.5, −135.0 to −139.0

Example 3

Example for Synthesis of (B-1a)

The following compound (B-1a) (wherein the number of k is a positive number which brings $M_n$ of the compound (B-1a) to be 1,050) was obtained in the same manner as in Example 1 except that methanol was used instead of glycerol. It was confirmed that no —OCF$_2$O— structure was contained in the compound (B-1a). Of the compound (B-1a), $M_n$ was 1,050, $M_w/M_n$ was 1.06, and the absolute viscosity at 20° C. was 60 mPa·s.

$$CF_3O(CF_2CF_2O)_kCF_2CH_2OH \quad (B\text{-}1a)$$

$^1$H-NMR δ (ppm): 3.94
$^{19}$F-NMR δ (ppm): −65.5, −80.1, −88.2 to −90.5

Example 4

Example for Synthesis of (B-2a)

The crude product obtained in Example 1 was purified to obtain the following compound (B-2a) (in the formula, the sum of k, r and p is a number which brings $M_n$ of the compound (B-2a) to be 1,000) from a low molecular weight fraction. Of the compound (B-2a), $M_n$ was 1,000, the absolute viscosity at 20° C. was 200 mPa·s, and $M_w/M_n$ was 1.08.

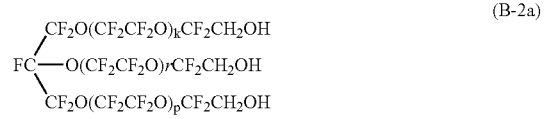

(B-2a)

$^1$H-NMR δ (ppm): 3.94
$^{19}$F-NMR δ (ppm): −80.1, −88.2 to −90.5, −135.0 to −139.0, −181.5 to −184.5

Example 5

Example for Preparation of Ether Composition

Examples 5-1 to 5-4

The compounds obtained in Examples 1 to 4 were mixed in a ratio as identified in Table 1 to prepare ether compositions 1 to 4. The results of measuring the absolute viscosities of the respective ether compositions at 20° C. are shown in Table. The ratio (unit:mass %) of ether compound (B) is a ratio based on the polyether compound (A). The absolute viscosity is a value at 20° C.

Fomblin Z-TtetraOL 2000 used for the ether composition 3 is a commercially available product manufactured by Solvay, and its average molecular weight is 1,950, $M_w/M_n$ is 1.25, and the absolute viscosity is 155 mPa·s.

TABLE 1

| Composition | Polyether compound (A) | Ether compound (B) | Ratio of ether compound (B) | Absolute viscosity | Average molecular weight | Molecular weight distribution |
|---|---|---|---|---|---|---|
| 1 | (A-11) | (B-1a) | 10 | 1,650 | 1,800 | 1.32 |
| 2 | (A-11) | (B-2a) | 25 | 1,800 | 1,850 | 1.30 |
| 3 | (A-11) | Fomblin | 10 | 2,000 | 1,950 | 1.25 |
| 4 | (A-21) | (B-1a) | 10 | 1,500 | 1,750 | 1.18 |

Example 6

Example for Evaluation of Ether Composition

Example 6-1

Solubility

Each of the ether compositions 1 to 4 prepared in Example 5 was added in R-225 (manufactured by Asahi Glass Company, Limited, tradename: Asahiklin AK-225) or AE-3000 (manufactured by Asahi Glass Company, Limited, tradename) respectively at 0.1 mass %, followed by stirring. Solubility was visually confirmed and evaluated based on evaluation standards ○: uniformly dissolved and X: non-uniformly dissolved or precipitation observed.

Example 6-2

High Temperature Properties

Each of the ether compositions prepared in Example 5 was heated to 500° C. by a thermogravimetric analyzer to measure the weight loss profile. Measurement was carried out while flowing dry nitrogen at 100 cc/min at a temperature-raising rate of 10° C./min. The weight loss up to 200° C. was measured as a measure of evaporativity at the time of use. The ratio of the mass reduced by heating the composition from 20° C. to 200° C. was determined by the mass % and the results are shown in Table 2. The weight loss was 3 mass % or less in each ether composition, whereby they can stably be used under high temperature conditions.

TABLE 2

| Composition | Solubility in R-225 | Solubility in AE-3000 | Weight loss (mass %) |
|---|---|---|---|
| 1 | ○ | ○ | 2 |
| 2 | ○ | ○ | 2 |
| 3 | ○ | ○ | 1 |
| 4 | ○ | ○ | 2.5 |

INDUSTRIAL APPLICABILITY

The present invention provides a novel ether composition useful as a lubricant, a surface modifier, etc. or as a surfactant, etc. The ether composition of the present invention has a low vapor pressure and a low viscosity, has high chemical stability and has little problem of deterioration at the time of use. Further, the ether composition of the present invention is a compound excellent in self-replenishing property and is thereby useful for the above application.

The entire disclosure of Japanese Patent Application No. 2005-217111 filed on Jul. 27, 2005 including specification, claims and summary is incorporated herein by reference in its entirety.

What is claimed is:

1. An ether composition comprising
a polyether compound (A) containing at least three —(OCF$_2$CF$_2$)— units, containing no —OCF$_2$O— structure and having an average molecular weight of higher than 2,000 and at most 20,000, and
an ether compound (B) containing at least one —(OCF$_2$CF$_2$)— unit and having an average molecular weight of at most 2,000,
wherein the polyether compound (A) comprises one or more of compounds represented by the following formula (A-1) having an average molecular weight of higher than 2,000 and at most 20,000 and/or one or more of compounds represented by the following formula (A-2) having an average molecular weight of higher than 2,000 and at most 20,000:

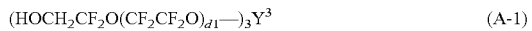

$$(HOCH_2CF_2O(CF_2CF_2O)_{d1}—)_3Y^3 \quad (A-1)$$

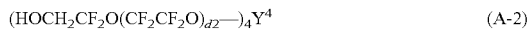

$$(HOCH_2CF_2O(CF_2CF_2O)_{d2}—)_4Y^4 \quad (A-2)$$

wherein $Y^3$ is a perfluoroalkane triyl group, $Y^4$ is a perfluoroalkane tetrayl group, d1 is a positive number of at least 1, and d2 is a positive number of at least 1.

2. The ether composition according to claim 1, wherein the polyether compound (A) has an average molecular weight of higher than 2,000 and at most 20,000 and a molecular weight distribution ($M_w/M_n$) of from 1.05 to 1.65.

3. The ether composition according to claim 1, wherein the absolute viscosity of the polyether compound (A) at 20° C. is at least 1,500 mPas, and the absolute viscosity of the ether composition at 20° C. is lower by at least 200 mPas than the absolute viscosity of the polyether compound (A) at 20° C.

4. The ether composition according to claim 1, wherein the ether compound (B) is any one or more selected from compounds represented by the following formulae (B-1) to (B-6):

$$HOCH_2CF_2O(CF_2CF_2O)_{d3}-Y^{10} \quad (B\text{-}1)$$

$$(HOCH_2CF_2O(CF_2CF_2O)_{d4}-)_3Y^{11} \quad (B\text{-}2)$$

$$HOCH_2CF_2O(CF_2CF_2O)_{d6}(CF_2O)_{g1}CF_2CH_2OH \quad (B\text{-}3)$$

$$HOCH_2CH(OH)CH_2OCH_2CF_2O(CF_2CF_2O)_{d7}(CF_2O)_{g2}CF_2CH_2OCH_2CH-(OH)CH_2OH \quad (B\text{-}4)$$

$$HOCH_2CH_2OCH_2CF_2O(CF_2CF_2O)_{d8}(CF_2O)_{g3}CF_2CH_2OCH_2CH_2OH \quad (B\text{-}5)$$

$$(HOCH_2CF_2O(CF_2CF_2O)_{d9}-)_2Y^{12}(-O(CF_2CF_2O)_{d10}OCF_3) \quad (B\text{-}6)$$

wherein
in the formula (B-1), $Y^{10}$ is a $C_{1\text{-}6}$ perfluoroalkyl group, d3 is a positive number of at least 1, and the average molecular weight of the compound represented by the formula (B-1) is from 1,000 to 2,000;
in the formula (B-2), $Y^{11}$ is a perfluoroalkane triyl group, d4 is a positive number of at least 1, and the average molecular weight of the compound represented by the formula (B-2) is from 500 to 2,000;
in the formula (B-3), d6 is a positive number of at least 1, g1 is a positive number of at least 0, and the average molecular weight of the compound represented by the formula (B-3) is from 500 to 2,000;
in the formula (B-4), d7 is a positive number of at least 1, g2 is a positive number of at least 0, and the average molecular weight of the compound represented by the formula (B-4) is from 500 to 2,000;
in the formula (B-5), d8 is a positive number of at least 1, g3 is a positive number of at least 0, and the average molecular weight of the compound represented by the formula (B-5) is from 500 to 2,000; and
in the formula (B-6), each of d9 and d10 is a positive number of at least 1, $Y^{12}$ is a perfluoroalkane triyl group, and the average molecular weight of the compound represented by the formula (B-6) is from 500 to 2,000.

5. The ether composition according to claim 1, wherein the absolute viscosity of the ether compound (B) at 20° C. is less than 1,000 mPas.

6. The ether composition according to claim 1, wherein the amount of the ether compound (B) is from 1 to 49 mass % based on the polyether compound (A).

7. The ether composition according to claim 1, which has an absolute viscosity at 20° C. of at most 2,000 mPas.

8. The ether composition according to claim 1, which has an average molecular weight of from 1,000 to 20,000, and a molecular weight distribution ($M_w/M_n$) of from 1.02 to 1.7.

9. A process for producing the ether composition as defined in claim 1, which comprises mixing the polyether compound (A) with the ether compound (B).

10. A lubricant containing the ether composition as defined in claim 1 as an essential component.

11. A solution composition containing the ether composition as defined in claim 1 and a solvent.

12. The solution composition according to claim 11, wherein the total concentration of the polyether compound is (A) and the ether compound (B) contained in the ether composition in the solution composition is from 0.005 to 50 mass %.

* * * * *